United States Patent
Cuevas Deusa et al.

(10) Patent No.: US 11,613,666 B2
(45) Date of Patent: Mar. 28, 2023

(54) INKJET INKS FOR CERAMIC TILE DECORATION

(71) Applicants: SUN INKJET CERAMICS, S.L., Castellon (ES); SUN CHEMICAL LIMITED, Somerset (GB)

(72) Inventors: Vicente Cuevas Deusa, Castellón (ES); Francisco Javier Balcells-Gomez, Castellón (ES); Ramon Bono Palomar, Castellón (ES); Maria Teresa Tichell Alegre, Castellón (ES); Ian Brough, Somerset (GB)

(73) Assignees: SUN INKJET CERAMICS, S.L., Castellon (ES); SUN CHEMICAL LIMITED, Somerset (GB)

(*) Notice: Subject to any disclaimer, the term of this patent is extended or adjusted under 35 U.S.C. 154(b) by 0 days.

(21) Appl. No.: 17/763,525

(22) PCT Filed: Oct. 6, 2020

(86) PCT No.: PCT/ES2020/070604
§ 371 (c)(1),
(2) Date: Mar. 24, 2022

(87) PCT Pub. No.: WO2021/074466
PCT Pub. Date: Apr. 22, 2021

(65) Prior Publication Data
US 2022/0282105 A1    Sep. 8, 2022

Related U.S. Application Data

(60) Provisional application No. 62/916,464, filed on Oct. 17, 2019.

(51) Int. Cl.
*C09D 11/38* (2014.01)
*B41M 5/00* (2006.01)
(Continued)

(52) U.S. Cl.
CPC ............ *C09D 11/38* (2013.01); *B41J 2/2107* (2013.01); *B41M 5/007* (2013.01);
(Continued)

(58) Field of Classification Search
CPC ............ B41J 2/01; B41J 2/211; B41J 2/1433; B41J 2/17; B41J 2/17593; B41J 2/2107;
(Continued)

(56) References Cited

U.S. PATENT DOCUMENTS

| 8,603,233 B2 | 12/2013 | Vignali et al. |
| 9,039,822 B2 | 5/2015 | Fornara et al. |

(Continued)

FOREIGN PATENT DOCUMENTS

| CN | 105176196 A | 12/2015 |
| CN | 106 046 939 A | 10/2016 |

(Continued)

OTHER PUBLICATIONS

International Search Report issued in International Application No. PCT/ES2020/070604, dated Dec. 18, 2020.
(Continued)

*Primary Examiner* — Manish S Shah
(74) *Attorney, Agent, or Firm* — Marian E. Fundytus; Ostrolenk Faber LLP.

(57) ABSTRACT

Solvent-based pigmented ceramic inkjet ink compositions including a solvent blend consisting predominantly of one or more hydrophobic solvent(s) (preferably one or more hydrophobic long chain hydrocarbon solvent(s)) are capable of achieving superior print quality when applied over unfired glazes by the inclusion of less than 10% by weight of the composition of a water-soluble solvent, especially glycol ethers. These ink compositions are particularly suited to
(Continued)

ceramic tile decoration via the double fast firing process, with resulting improvements in absorption, color strength and print definition.

25 Claims, 2 Drawing Sheets

(51) Int. Cl.
| | |
|---|---|
| *B41M 7/00* | (2006.01) |
| *C04B 41/00* | (2006.01) |
| *C04B 41/45* | (2006.01) |
| *C04B 41/50* | (2006.01) |
| *C04B 41/87* | (2006.01) |
| *C09D 11/033* | (2014.01) |
| *C09D 11/037* | (2014.01) |
| *C09D 11/322* | (2014.01) |
| *C09D 11/36* | (2014.01) |
| *B41J 2/21* | (2006.01) |

(52) U.S. Cl.
CPC ........ *B41M 5/0023* (2013.01); *B41M 5/0047* (2013.01); *B41M 7/009* (2013.01); *C04B 41/009* (2013.01); *C04B 41/0072* (2013.01); *C04B 41/4543* (2013.01); *C04B 41/5033* (2013.01); *C04B 41/87* (2013.01); *C09D 11/033* (2013.01); *C09D 11/037* (2013.01); *C09D 11/322* (2013.01); *C09D 11/36* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 3/4078; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436

See application file for complete search history.

(56) References Cited

U.S. PATENT DOCUMENTS

| | | | |
|---|---|---|---|
| 9,908,819 B1* | 3/2018 | Kollenberg | ............ C04B 35/63 |
| 9,909,023 B2 | 3/2018 | Zavada et al. | |
| 2003/0011648 A1* | 1/2003 | Kabalnov | ................ B41J 3/407 |
| | | | 347/100 |
| 2007/0263061 A1* | 11/2007 | Kabalnov | .................. B41J 2/01 |
| | | | 106/31.13 |
| 2009/0311538 A1* | 12/2009 | Long | ......................... C03C 8/22 |
| | | | 427/397.8 |
| 2013/0265376 A1 | 10/2013 | Gil-Torrente et al. | |
| 2015/0291841 A1* | 10/2015 | Fores Fernandes | ........................ |
| | | | B41M 5/0047 |
| | | | 524/606 |
| 2017/0183524 A1* | 6/2017 | Coget | ........................ B41J 2/01 |
| 2017/0218211 A1* | 8/2017 | Caballero Lopez | .. C09C 1/0081 |

FOREIGN PATENT DOCUMENTS

| | | |
|---|---|---|
| WO | WO2006/126189 | 11/2006 |
| WO | WO 2015/158738 A1 | 10/2015 |
| WO | WO2015157071 | 10/2015 |
| WO | WO2016/146816 A2 | 9/2016 |
| WO | WO 2016/210145 A1 | 12/2016 |
| WO | WO 2018193438 A1 | 10/2018 |

OTHER PUBLICATIONS

Written Opinion of the International Searching Authority issued in International Application No. PCT/ES2020/070604, dated Dec. 18, 2020.
International Preliminary Report on Patentability (Chapter 1 of the Patent Cooperation Treaty) issued in International Application No. PCT/ES2020/070604 dated Feb. 4, 2022.

* cited by examiner

INKJET INKS FOR CERAMIC TILE DECORATION

CROSS REFERENCE TO RELATED APPLICATIONS

The present application is a § 371 National Phase application based on PCT/ES2020/070604 filed Oct. 6, 2020, which claims the benefit of U.S. Provisional Application No. 62/916,464, filed Oct. 17, 2019 the subject matter of each of which is incorporated by reference in their entirety.

Solvent-based pigmented ceramic inkjet ink compositions comprising a solvent blend consisting predominantly (i.e. greater than 50%, preferably greater than 70% of the blend) of one or more hydrophobic solvent(s) (preferably one or more hydrophobic long chain hydrocarbon solvent(s)) are capable of achieving superior print quality when applied over unfired glazes by the inclusion of less than 10% by weight of the composition of a water-soluble solvent, especially glycol ethers. These inkjet ink compositions are particularly suited to ceramic tile decoration via the double fast firing process, with resulting improvements in absorption, colour strength and print definition.

BACKGROUND OF THE INVENTION

WO2018/193438 describes glass frit inkjet compositions comprising a 2-component immiscible solvent composition where a bridging solvent is used to bring the solvent blend into a single phase. This third solvent may include a glycol ether. WO2018/193438 does not disclose how pigmented inks of the current invention comprising predominantly hydrophobic solvents with low concentrations of a glycol ether (preferably ≤10% by weight of the ink composition) when printed over an unfired glaze can lead to the improvements in tile decoration quality observed by the inventors.

WO2016/110724 also describes glass frit inkjet compositions which may use glycol ethers as the solvent. In this case, the solvent is predominantly formed of glycol ethers, as expressed by the examples. There is no disclosure of the use of a solvent blend according to the current invention, nor the effects that such a solvent blend may induce in the double fast firing process.

US2011/0232524 discloses ceramic inkjet inks using glycol ethers as the predominant solvent, but does not demonstrate the benefits of the solvent blend of the current invention.

U.S. Pat. No. 9,796,861 describes dispersants for pigments used in ceramic inkjet ink compositions. By way of the description, a broad range of solvents suitable for the preparation of inks are mentioned including long chain aliphatic and glycol ether solvents. However, again, there is no disclosure of the benefits resulting from a predominantly hydrophobic solvent blend, modified with a minor component of a water-soluble, hydrophilic solvent, according to the current invention.

U.S. Pat. No. 9,909,023 discloses ceramic inkjet ink compositions comprising colourant salt precursors rather than ceramic pigments, where the solvent consists of water-soluble types, including glycol ethers. The current invention describes pigmented inks and U.S. Pat. No. 9,909,023 does not reveal, or allude to, the benefits accruing from the current invention in the double fast firing process.

Aqueous pigmented ceramic inkjet inks are known and may use glycol ethers and glycol ether esters as co-solvents with water. WO2006/126189 and US2017/0298245 describe such compositions. A feature of inkjet compositions prepared according to the current invention is that they comprise less than 5% of water.

Although a number of references disclose ceramic inkjet inks comprising solvent blends which may encompass hydrophobic solvents such as C12-C30 hydrocarbons and water-soluble solvents, such as glycol ethers, there has been no disclosure of how the inclusion of a small amount (preferably ≤10% by weight of the ink composition) of a water-soluble solvent into a predominantly oil-based ink can lead to the improved print qualities described by the invention herein. Moreover, analysis of the prior art has not revealed any disclosure about the use of inks prepared according to the current invention in the double fast firing process. Double fast firing is the most widely used technology for the production of ceramic tiles such as red clay wall tiles for indoor applications. As such, the current invention and the clear benefits it confers over existing state-of-the-art technology, based on oil-based ceramic inkjet ink compositions, is clearly beneficial.

From around the year 2000 onward, single pass inkjet printing became the most prevalent technology for ceramic tile decoration. The early technology was based on the use of colorant organometallic complexes dissolved in various organic solvent blends which developed the desired colors during the firing process. This early generation technology was subject to a number of technical limitations including stability issues, as well as limited color intensity and color range. Although improvements to this technology are still being sought, greater technical and commercial success has been achieved through the use of solvent-based inkjet compositions comprising dispersions of pigments suitable for ceramic decoration.

A current issue facing ceramic inkjet inks based on typical hydrophobic ester and aliphatic solvents is that when they are printed over unfired glazes, via the well-known double fast firing process, they are prone to producing poor print quality. This poor print quality manifests itself as blurring, variable colour strength, gloss differential across the tile, cracking and bleed.

These print quality issues, which become apparent after firing the glaze-ink combination, have been found by the inventors to be related to the poor absorption of the oil-based inks into the first-down glaze. The inventors have found that the inclusion of a small amount (preferably ≤10%, more preferably ≤5% by weight of the composition) of a glycol ether into the composition results in much more rapid absorption of the ink into the glaze leading to significantly enhanced quality of the printed and fired ceramic tile.

Inspection of the prior art indicates that this is a unique finding for inkjet inks comprising ceramic pigments intended for ceramic decoration.

There are a number of issues, as mentioned previously, relating to current oil-based (i.e. solvent-based) pigmented inkjet technology for ceramic tile decoration, applied via the double fast firing process, leading to cosmetically undesirable defects on the finished ceramic (e.g. clay) tile product. The surprising finding that minor additions (preferably ≤10%, more preferably ≤5% by weight of the composition) of a water-soluble solvent to these essentially highly hydrophobic ink fluids overcome these defects is clearly advantageous and provides a high-performance technology compared with the current state of the art.

Although ceramic inkjet inks which may comprise blends of various solvents have been disclosed by way of the descriptions in a number of the identified background documents, there has been no disclosure of, or reference to, how an essentially hydrophobic solvent blend can be modified with a minor addition of a water-soluble solvent to produce such significant improvements of colour strength and print definition in tile decoration by the double fast firing process.

Citation or identification of any document in this application is not an admission that such represents prior art to the present invention.

SUMMARY OF INVENTION

In a first aspect, the present invention provides a solvent-based pigmented ceramic inkjet ink composition comprising a solvent blend comprising one or more hydrophobic solvent(s) and one or more water-soluble hydrophilic solvent(s).

In a second aspect, the present invention provides a ceramic tile comprising the composition according to the first aspect.

In a third aspect, the present invention provides a process for preparing a ceramic tile comprising printing the composition according to the first aspect onto an unfired, water-containing glaze on a pre-fired ceramic tile (such as a clay tile), wherein said printing is single pass inkjet printing, and then firing the tile via a double fast firing process.

In a fourth aspect, the present invention provides a ceramic tile prepared according to the process according to the third aspect.

In a fifth aspect, the present invention provides use of the composition according to the first aspect for ceramic tile decoration via the double fast firing process.

In a sixth aspect, the present invention provides use of a solvent blend comprising one or more hydrophobic solvent(s) and one or more water-soluble hydrophilic solvent(s) as defined in the first aspect in a solvent-based pigmented ceramic inkjet ink composition to increase colour strength and print definition in ceramic tile decoration by the double fast firing process.

DETAILED DESCRIPTION

Figure 1:
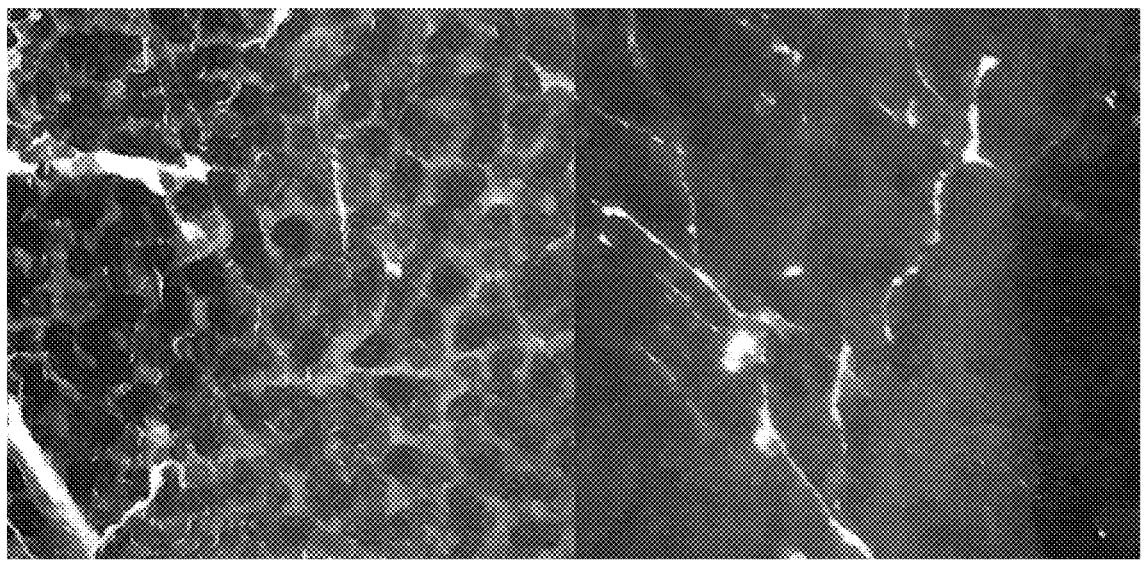
FIG. 1 is an image showing a comparison of a surface coated with a set of inventive inks (right-hand side) and a set of comparative commercially available inks (left-hand side). As can be seen, the set of comparative inks (left-hand side) produces blurring defects after firing, whereas minimal blurring is achieved with the set of inventive inks (right-hand side).

The current invention is directed towards what are commonly referred to by those skilled in the art as oil-based (or solvent-based) ceramic inkjet inks. These are essentially dispersions of ceramic decoration pigments in an organic solvent such as the dearomatized hydrocarbon Exxsol D140 solvent used in the examples. Accordingly, the current invention is directed towards solvent-based pigmented ceramic inkjet ink compositions.

It should be understood that any combination of organic solvents may be used including but not limited to mineral oils, hydrocarbon solvents, long chain aliphatic solvents such as paraffins, dearomatized aliphatic hydrocarbons such as those sold under the Exxsol brand (ex. ExxonMobil), ester solvents, glycols, glycol ethers, branched C12-C32 alcohols (such as those sold under the Isofol tradename, ex. Sasol), naphthenic oils, etc. As used herein, the term "long chain" refers to C12-C40, preferably C12-C30 hydrocarbons.

The current invention leads to enhanced ceramic (e.g. clay) tile decoration via the double fast firing process. The double fast firing process involves, in a first step, the firing of a ceramic tile (such as a clay tile) to produce a non-glazed tile known as a biscuit. This pre-fired tile (biscuit) is then glazed, printed and fired for a second time to produce the final decorated tile. The benefits of this process, whereby the tile (e.g. the clay tile) is fired first, is that any distortion effects of glazing and printing a tile (e.g. an unfired clay tile) and then firing the tile are alleviated. In the double fast firing process, the aqueous glaze applied to the tile, prior to printing with ceramic inkjet inks, is not fully dried and as such the glaze layer comprises significant concentrations of water. When an essentially hydrophobic oil-based ceramic inkjet ink is printed onto the glaze layer it absorbs poorly into the glaze and this can lead to the aforementioned defects of ink blurring, ink bleed, differential gloss and cracking. The inclusion of a small amount, preferably ≤10% (w/w) of a water-soluble solvent, more preferably ≤5% (w/w), especially glycol ethers, into the ink composition results in enhanced absorption of the ink into the unfired glaze thereby alleviating the defects previously described.

None of the identified background documents reveal the benefits of the current invention whereby the minor modification of the essentially hydrophobic solvent blend (typically aliphatic hydrocarbons and esters) with a small amount of water-soluble solvent, especially any blend of glycol ethers, results in such surprising improvements in the quality of the finished decorated and fired tile (such as a clay tile) produced via the double fast firing process. This is clearly not only technically advantageous over the identified background documents but also over the current state-of-the-art oil-based ceramic inkjet technology, as practised commercially.

The double fast firing process, which the current invention addresses, involves the application of a water-based glaze to a pre-fired tile, which is then printed with the solvent-based pigmented ceramic inkjet ink via single pass inkjet printing, before the decorated tile is fired to produce the finished decorated tile product. Firing of the tiles typically takes place at temperatures between 500-1500° C. The advantages of this process are the tight tolerance in tile size, with no shrinkage of the decorated tile occurring during the firing process after the glazes and inks have been applied. This is due to the pre-firing of the tile (e.g. the clay tile) before the coating and printing processes to produce a dimensionally stable tile, which is commonly referred to as a biscuit. Other ceramic tile decoration processes involve a single firing process where the glazes and inks are applied to unfired (green) tiles. During the firing process, of decorated green tiles, distortion of the tile may occur. This is undesirable, especially for the indoor market where the double fast firing process delivers the desired, dimensionally stable, decorated and finished tile product, preferably clay tile product.

The double fast firing process involves applying a first-down water-based glaze to the pre-fired biscuit, to which a solvent-based ceramic inkjet decorative design is printed on to the top surface. There is minimal drying between the application of the glaze and the ink. The common solvent carrier medium for the solvent-based ceramic inkjet fluid is selected from long chain C12-C30 aliphatic hydrocarbons and high boiling ester solvents (preferably esters having a boiling point of greater than about 235° C., preferably greater than 280° C.), such as dioctyl cocoate. However, the use of such solvents makes the inks highly hydrophobic resulting in a tendency for them to poorly absorb into the water-containing first-down glaze. This poor absorption of the ink into the glaze can lead to a number of undesirable defects such as blurring, bleeding, refractory finish and cracking of the color print.

Blurring is generated when printing a design with intermediate ink discharge, typically in the range 20 to 30 $g/m^2$. Since the rate of ink absorption into the water-saturated glaze is deficient, as previously mentioned, then on half-tone printed areas of the design, the neighbouring drops of the printed design (of different colours) may coalesce at the surface, giving a somewhat stained appearance, almost as if the image was printed at very low resolution with big drops. Clearly, this blurring effect reduces the resolution that is achievable by the inkjet printing process.

Bleeding relates to solid areas in the print design (100% tone level) where the non-absorbed ink flows out over the damp glaze leading to distortion of the image edges and also mixing with other areas of the printed design resulting in colour halos and again poor print resolution.

Ceramic inkjet decoration of tiles (such as clay tiles) often involves applying the inks at high inkjet grey scales. It is common that inks are applied at equivalent dosage rates of greater than 10 $g/m^2$, more often greater than 20 $g/m^2$, and even at levels greater than 30 $g/m^2$. These high ink discharge levels result in areas of excessive, poorly absorbed ink sitting on the surface of the damp glaze, resulting in the ceramic pigment also being largely located on the surface of the glaze. A consequence of this poor absorption of the ink is that when the decorated tile is fired, the pigment is not integrated correctly into the melting glaze, giving an undesirable rough, matte appearance (refractory finish). In some cases where such high grey scales are applied in a flat enough design, then during firing a hard and brittle thin layer of ink over the melted glaze can form resulting in cracks within the design.

By way of the comparative examples the inventors clearly show how the current state-of-the-art technology for the double fast firing production of decorated red clay tiles, via single pass inkjet printing, is prone to such defects.

The inventors have surprisingly found that the introduction of a low concentration, preferably ≤10% (w/w) of a water-soluble hydrophilic solvent, more preferably ≤5%, of a water-soluble hydrophilic solvent, such as a glycol ether, into oil-based ceramic inkjet inks significantly enhances the absorption of the inks into the damp first-down glaze in the double fast firing process. The water-soluble hydrophilic solvent may present at an amount of 0.1-20%, 0.1-15%, 0.1-8%, 0.1-5%, 0.1-3%, 1-20%, 1-15%, 1-10%, 1-8%, 1-5% or 1-3% by weight of the composition as well as intermediate ranges. This enhanced absorption of the ink into the damp glaze ensures that print resolution is maintained, with minimal bleed or blurring, and also good mixing of the ceramic pigment with the glaze during the firing process to reduce the issues of refractory effect and cracking. The inventors, by way of the examples, show that when conventional oil-based ceramic inkjet inks are deposited onto aqueous glazes at the relatively high ink discharge of 65 $g/m^2$ and subsequently fired, that all these problematic issues become apparent. However, the introduction of the water-soluble hydrophilic solvent effectively eliminates these defects. Thus, it is a further feature of the invention that ink discharges of greater than 30 $g/m^2$, and more especially greater than 40 $g/m^2$, are covered. In a preferred embodiment, the water-soluble hydrophilic solvent is tripropylene glycol n-butyl ether.

A further benefit from the current invention is that the more rapid absorption of the inventive inks into the water-containing first-down glaze results in faster drying of the ink. In the context of the invention, drying refers to the time taken for the ink solvent to absorb into the glaze, leaving a touch-dry surface. This is advantageous as it will allow for faster press line speeds than is currently achievable, resulting in higher productivity in decorated tile production.

The incorporation of low concentrations of water-soluble hydrophilic solvents to enhance the drying and print properties, as previously described, has been found to be particularly advantageous in the case of inks based on aliphatic hydrocarbon solvents, such as the Exxsol D140 (a dearomatized hydrocarbon solvent), used in the examples.

As used herein, the term "pigmented ceramic inkjet ink composition" refers to a solvent-based inkjet ink composition comprising ceramic pigments, preferably one or more dispersion(s) of ceramic pigments. Thus, the solvent-based inkjet ink composition according to the present invention preferably comprises ceramic pigments, preferably one or more dispersion(s) of ceramic pigments.

Preferably, the amount of ceramic pigment used in the composition according to the present invention is from about 15 to about 65% (w/w), preferably from about 20 to about 60% (w/w), preferably from about 25 to about 55% (w/w) of the composition.

As used herein, the term ceramic pigment refers to any material that can be used in ceramic decoration, for example, ceramic pigments that impart colour to a surface and frits that impart surface effects to ceramics.

Thus, the invention encompasses any pigment recognised as suitable for ceramic decoration including, but not limited ceramic pigments that impart colour to a surface of a substrate such as zirconates and silicates of Cr, Sn, Ni, Fe and Co and oxides thereof. Preferably, the ceramic pigment is a ceramic pigment that imparts colour to a surface of a substrate (e.g. a ceramic tile), more preferably the ceramic pigment is a transition metal complex oxide, particularly preferred are zirconates and silicates of Cr, Sn, Ni, Fe and Co and oxides thereof. It will be understood by those skilled in the art that not only any ceramic pigment or frit may be used, but also any other typical component used in the manufacture of ceramic inkjet inks are incorporated by the current invention. In an alternative embodiment, the ceramic pigment may be a material that imparts surface effects to a substrate such as a frit.

There is no restriction on the dispersant or any combination of dispersants used to disperse the pigment but may be selected from those sold under the Solsperse (ex. Lubrizol), Disperbyk (ex. Byk), Efka, Dispex, etc. (ex. BASF), E-Sperse (ex. Ethox), Fluijet (ex. Lamberti), Tego (ex. Evonik), Decoflux, Product, etc. (ex. Zschimmer & Schwarz), Cliqsperse (ex. Cliq), Spredox (ex. Doxa), Deco (ex Decoroil), Ubedisp (ex. Ube), "Synthro" (ex. Quimoprox), brand names.

Preferably, the amount of dispersant used in the composition according to the present invention is from about 1 to about 10% (w/w), preferably from about 1 to about 8% (w/w), preferably from about 1 to about 6% (w/w) of the composition.

Preferably, the amount of solvent used in the composition of the current invention is from about 30% to about 80%

(w/w), preferably from about 35% to about 75% (w/w), more preferably from about 40% to about 70% (w/w) of the composition.

Although the invention is directed towards hydrophilic glycol ether solvents as the minor component of the essentially hydrophobic solvent blend, it should be understood by those skilled-in-the-art that any other water-soluble hydrophilic solvent may be used, including but not limited to glycols and poly(ethylene glycol)s. Preferably the hydrophilic water-soluble solvent of the invention should have a boiling point of greater than 100° C., and more preferably a boiling point of greater than 150° C. It should be further understood that the invention encompasses any blend of hydrophilic water-soluble solvents.

The solvent blend of the invention is defined as one where the majority of the blend (i.e. i.e. greater than 50%, preferably greater than 70%, more preferably greater than 80% of the blend) is formed of hydrophobic solvents. In the case of the examples, the inventors have used the aforementioned Exxsol D140, and also the vegetable oil derived solvent, Agripure AP-406 (ex. Cargill). Thus, the invention is further defined in that the hydrophilic solvent should preferably form less than 50% (w/w) of the total solvent blend and more preferably less than 30% (w/w) of the total solvent blend, and most preferably less than 20% (w/w) of the total solvent blend.

Preferably, the hydrophobic solvent is selected from long chain C12-C30 aliphatic hydrocarbons, high boiling ester solvents (preferably esters having a boiling point of greater than about 235° C., more preferably greater than 280° C.), such as dioctyl cocoate and Radia solvents, and combinations thereof. Preferably, the hydrophobic solvent is a long chain C12-C30 aliphatic hydrocarbon such as Exxsol D140 in combination with a vegetable oil derived solvent such as Agripure AP-406 or a Radia solvent (e.g. Radia 7956). Preferably, the hydrophobic solvent is a combination of Exxsol D140 and a Radia solvent (e.g. Radia 7956).

As previously mentioned, there is no limitation on the choice of the water-soluble hydrophilic solvent, other than the previously laid out preferences. A non-limiting list of water-soluble hydrophilic solvents, including glycol ethers, that have been successfully tested by the inventors, along with their reported boiling points, includes dipropylene glycol monobutyl ether (230° C.); dipropylene glycol monopropyl ether (213° C.); propylene glycol monobutyl ether (171° C.); propylene glycol monopropyl ether (149° C.); tripropylene glycol monobutyl ether (274° C.); dipropylene glycol monomethyl ether (190° C.); tripropylene glycol monomethyl ether (243° C.); diethylene glycol (198° C.); diethylene glycol monobutyl ether (230° C.); dipropylene glycol dimethyl ether (175° C.); ethylene glycol phenyl ether (244° C.); propylene glycol methyl ether (120° C.). Although the majority of these are monoalkyl glycol ethers it should be noted that the inventors have successfully used the dialkyl ether, dipropylene glycol dimethyl ether, and the simple glycol, diethylene glycol. Thus, the invention includes any glycol ether, any monoalkyl or dialkyl ether thereof, and also aromatic ethers of any glycol ether.

Glycol ethers may be selected from any of the following non-limiting list: ethylene glycol; diethylene glycol; triethylene glycol; tetraethylene glycol; propylene glycol; dipropylene glycol; tripropylene glycol; tetrapropylene glycol; butylene glycol; dibutylene glycol; tributylene glycol; tetrabutylene glycol; Where the hydrophilic solvent is a mono- or dialkyl ether of a glycol, the alkyl component of the solvent may be selected from any of methyl, ethyl, propyl, butyl, and higher homologues and isomers thereof. Phenyl ethers of any glycol are also encompassed by the invention.

From the preceding list it is clear that glycols, glycol monoethers and glycol diethers, and any blend are all encompassed by the current invention. It is interesting to note that the inventors found that ethylene glycol phenyl ether was also successful in enhancing the absorbency of oil-based ceramic inkjet inks into the damp glaze in the double fast firing process. This is a further surprising finding as this solvent has a reported solubility in water of only 3.0% (w/w). Therefore, in a further aspect of the invention, the hydrophilic water-soluble solvent component of the invention would preferably have a water-solubility in water of 2.5% (w/w), or greater.

In a further aspect, the hydrophilic water-soluble solvent may be glycerol.

Preferably, the inkjet ink compositions according to the current invention comprise less than 5%, preferably less than 3%, more preferably less than 1% by weight of water.

Advantageously, the viscosity of the inkjet ink composition may be modulated by suitable solvents blends. Suitable solvent blends for viscosity adjustment may be based on Exxsol D-140, dioctyl adipate, Radia solvents, ethylhexyl cocoate, ethylhexyl laurate, ethylhexyl palmitate, ethylhexyl myristate, rapeseed methyl ester, a polybutene (e.g. polybutene PIB24 or Indapol H100), Hexamoll DINCH (i.e. 1,2-cyclohexane dicarboxylic acid diisononyl ester), a branched C12-C32 alcohol (e.g. one sold under the tradename Isofol), ethyl oleate and combinations thereof. Preferably, a polybutene in Exxsol D-140 is used to adjust the viscosity of the ink composition.

Advantageously, the viscosity is adjusted to about 5-30 mPa·s, preferably about 10-30 mPa·s, more preferably about 14-27 mPa·s. Viscosity may be measured at 40° C. and a shear rate of 23-37 $s^{-1}$ preferably at a shear rate of 28-32 $s^{-1}$ but in the work described herein viscosity was measured at 40° C. and a shear rate of 30.8 $s^{-1}$ using a Fungilab rotational viscometer.

In the context of the present invention, the term "particle size" refers to the volume distributed median particle diameter (equivalent spherical diameter (esd)). The term "D90" as used herein refers to the 90th percentile volume-based median particle diameter, i.e. the diameter below which 90% by volume of the particle population is found—also referred to as the "D(v,0.9)" value. Particle size distributions can be determined by routine laser diffraction techniques. Unless stated otherwise, particle size distribution measurements as specified or reported herein are as measured by the conventional Malvern Mastersizer 3000 particle size analyzer from Malvern Instruments. Unless stated otherwise, colour intensity was measured using an i1 Basic Pro 3 colorimeter (from XRite) and the L, a, b scale. Unless otherwise stated, data were collected using Argyll colour management system.

The compositions of the invention may further comprise any blend of additives, including but not limited to de-aerators, antifoams, surfactants/surface control additives, etc.

The invention is further described by the following numbered paragraphs:
1. A solvent-based oil-based pigmented ceramic inkjet compositions printing ink composition, comprising a solvent blend comprising hydrophobic solvents and water-soluble hydrophilic solvents.
2. The composition of paragraph 1, wherein the hydrophobic solvents comprise long chain hydrocarbon solvents.

3. The composition of paragraph 1, wherein the hydrophobic solvents are selected from the group consisting of long chain C12-C30 aliphatic hydrocarbons, high boiling ester solvents and blends thereof.
4. The composition of paragraph 1, wherein the hydrophobic solvents is dioctyl cocoate
5. The composition of paragraph 1, wherein the water-soluble hydrophilic solvent is 0.1-10% by weight of the composition.
6. The composition of paragraph 1, wherein the water-soluble hydrophilic solvent is 0.1-5% by weight of the composition.
7. The composition of paragraph 1, wherein the water-soluble hydrophilic solvent is 1-10% by weight of the composition.
8. The composition of paragraph 1, wherein the water-soluble hydrophilic solvent is 1-5% by weight of the composition.
9. The composition of paragraph 1, wherein the water-soluble hydrophilic solvent comprises at least one glycol and/or glycol ether.
10. The composition of any preceding paragraph, wherein the solvent of the inkjet composition is a blend of hydrophobic and hydrophilic solvents and wherein the hydrophilic solvent has a solubility in water of 2.5% (w/w), or greater, and forms less than 50% of the total solvent component of the ink composition.
11. The composition of any preceding paragraph, wherein the hydrophilic solvent forms less than 30% of the total solvent composition.
12. The composition of any preceding paragraph, wherein the hydrophilic solvent has a boiling point of greater than 100° C.
13. The composition of any preceding paragraph, wherein the hydrophilic solvent has a boiling point of greater than 150° C.
14. The composition of any preceding paragraph, wherein the hydrophilic solvent is a glycol monoalkyl ether.
15. The composition of any preceding paragraph, wherein the hydrophilic solvent is a glycol dialkyl ether.
16. The composition of any preceding paragraph, wherein the hydrophilic solvent is selected from the group consisting of propylene glycol, glycerol, liquid poly (ethylene glycol) and combinations thereof.
17. A ceramic tile comprising the composition of any one or more of paragraphs 1-16.
18. A process for preparing a ceramic tile, comprising printing the composition of any one or more of paragraphs 1-16 onto an unfired, water-containing glaze on a pre-fired clay tile by a single pass inkjet printing process and then firing the tile via the double fast firing process.
19. The process of paragraph 18, wherein the ink discharge level is greater than 20 g/m$^2$.
20. The process of paragraph 18, wherein the ink discharge level is greater than 30 g/m$^2$.
21. A ceramic tile prepared using the process of any one or more of paragraphs 18-20.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

As mentioned previously the inventors have examined a number of solvents and their concentration impact on the performance of oil-based ceramic pigmented inkjet inks in the double fast firing process.

The following examples demonstrate the benefits of the current invention in terms of the improvements in drying speed and also improvements in the quality of the print design of decorated, fired red clay tiles.

Example 1: Preparation of a Ceramic Brown Pigment Concentrate

In the first instance, a ceramic brown pigment concentrate was prepared according to the Example 1 formulation provided in Table 1, which was then used to prepare Comparative Example 2 and Inventive Example 3 (see Table 2). In particular, the ceramic brown pigment concentrate was prepared by introducing the solvents (Exxsol D-140 and Agripure AP-406) into a mixing tank followed by the dispersant (Solsperse J915) and then the ceramic pigment (zinc iron chromite brown spinel) and agitating the resulting mixture for at least two hours until the mixture was homogeneous. The resulting homogeneous mixture was then milled in a Netzsch attrition mill until the particle size distribution was less than 500 nm (D90), as measured by laser diffraction (using a Malvern Mastersizer 3000).

TABLE 1

| Example 1 Ceramic Brown Pigment Concentrate | |
| --- | --- |
| Material | Weight % |
| EXXSOL D-140 | 14 |
| AGRIPURE AP-406 | 19 |
| SOLSPERSE J915 | 7 |
| ZINC IRON CHROMITE BROWN SPINEL | 60 |
| Total | 100 |

Notes to Table 1:
Exxsol D140 is a dearomatized aliphatic hydrocarbon solvent (ex. ExxonMobil);
Agripure AP-406 is a vegetable oil based biosolvent (ex. Cargill);
Solsperse J915 is a dispersant (ex. BYK)

Examples 2 and 3: Preparation of Brown Inkjet Ink Compositions

Brown inkjet ink compositions were prepared in accordance with the formulations in Table 2. In particular, the brown ceramic pigment concentrate prepared in accordance with Table 1 was mixed with TPNB (where used), Exxsol D-140 and an additional solvent blend to adjust the viscosity to about 14-27 mPa·s at 40° C. and a shear rate of 30.8 s$^{-1}$. The resulting mixture is agitated for at least one hour and the inks were filtered to remove any oversized particles (greater than 1 micron) to provide a brown finished inkjet ink.

TABLE 2

Composition of Brown Inks

| | Weight % | |
|---|---|---|
| Material | Comp. Ex. 2 | Inv. Ex. 3 |
| TPNB | 0 | 5 |
| EXXSOL D-140 | 22 | 13 |
| Solvent blend for viscosity adjustment | 5 | 5 |
| AGRIPURE AP-406 | 0 | 4 |
| Ex. 1 Brown ceramic pigment conc. | 73 | 73 |
| Total | 100 | 100 |

Notes to Table 2:
TPNB = Dowanol TPNB (tripropylene glycol n-butyl ether, ex. Dow Chemical Co.);
Solvent Blend = additional solution of a polybutene in Exxsol D140 added to raise the viscosity to between 14 and 27 mPa · s. The viscosities of the inks were measured using a Fungilab rotational viscometer.

Example 4: Drying Response Time and Colour Intensity Measurements

In a first set of experiments with the comparative and inventive examples, a water-based glaze was applied to a pre-fired dff ('double fast firing') biscuit with a spray gun to a total weight of about 48 g on a 33×33 cm tile. Within 30 seconds of applying the glaze, a high discharge level of about 65 g/m² of the inks was applied over the glaze. The time taken for the ink to visibly dry, with the solvent of the ink being absorbed into the damp glaze, was recorded (see Table 3). The decorated tiles were then fired at 1050° C. and the colour intensity (using L, a, b scale) was measured using an i1 colorimeter (from XRite). The colorimetry results in Table 4 show an improvement in colour strength achieved with the inventive ink, which is probably due to a better mixing of the ink pigments with the glaze.

TABLE 3

Ink Drying Time

| Circle diameter | Drying Time (min.) | |
|---|---|---|
| (mm) | Inv. Ex. 3 | Comp. Ex. 2 |
| 10 | 9 | 48 |
| 20 | 11 | 57 |

TABLE 4

Colorimetry Results

| COLOUR SCALE | Inventive Example (Example 3) | Comparative Example (Example 2) |
|---|---|---|
| L | 44.14 | 43.02 |
| a | 12.86 | 10.41 |
| b | 14.48 | 10.51 |

An ink set consisting of brown, blue, pink, yellow and black inks was then prepared along the same guidelines as for the comparative and inventive examples previously described, by simply using color concentrates based on the appropriate pigment. The solvent blends for this ink set were similar to that previously described, with the inventive examples containing 5% (w/w) of TPNB and the comparative examples containing no TPNB.

The performance of the inks was assessed by applying them to glazed dff biscuits at ink discharge levels up to 50 g/m² using a colour palette swatch pattern typical of those used in the industry and well known in the art (consisting of a block of small squares, with every colour combination using the 5 present colours up to a 150% maximum amount of ink in total). The ink discharge levels of both the comparative (control) inks and the inventive inks were adjusted to apply equivalent ink amounts, and the aforementioned colour palette swatch was printed with both the comparative and inventive ink sets.

The following properties were determined;
1. Drying time of the inks over a color patch up to a maximum of 52 gr/m².
2. Color strength development measured in the color patch.
3. Minimisation or disappearance of the described defects; namely blurring, cracking and lack of definition.

Drying time of the inventive inks was up to 6 times faster than the comparative inks, depending on the ink discharge level. For a complete dry of the colour palette at 25° C., the required time for drying with the inventive inks was 6 minutes compared with the 30 minutes taken by the comparative ink examples.

An increase in colour strength was observed for each inventive ink colour compared with the corresponding comparative ink example, as measured with an i1 Basic Pro 3 colorimeter.

TABLE 5

Colorimetry Results for the Complete Ink Sets

| COLOR | Color development increase for inventive ink set |
|---|---|
| Brown | 10% |
| Blue | 12% |
| Pink | 9% |
| Yellow | 15% |
| Black | 7% |

Figure 2:
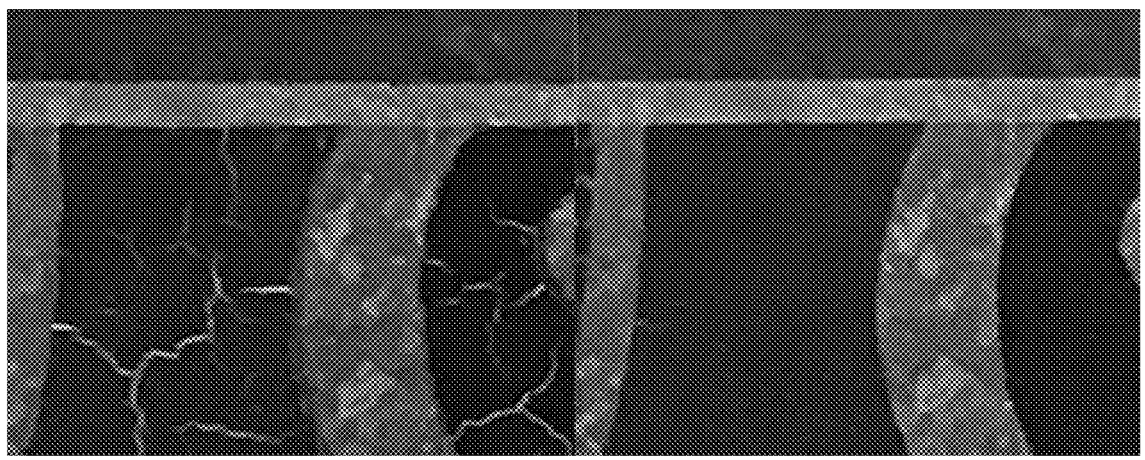
FIG. 2 is an image showing a comparison of a surface coated with a set of conventional inks (left-hand side) and a set of inventive inks (right-hand side). As can be seen, the set of comparative inks produces cracking defects (left-hand side), whereas the set of inventive inks produces crack-free tile decoration after firing (right-hand side).

As shown in FIGS. 1 and 2, it was also observed that the fired tiles printed with the inventive inks did not show any blurring or cracking, which was clearly apparent with the tiles produced using the comparative ink examples.

The invention claimed is:

1. A process for preparing a ceramic tile comprising:
printing a solvent-based pigmented ceramic inkjet ink composition onto an unfired water-containing glaze on a pre-fired ceramic tile; wherein said printing is single pass inkjet printing,
and then firing the tile via a double fast firing process;
wherein said composition comprises a solvent blend wherein the solvent blend comprises one or more hydrophobic solvent(s) and one or more water-soluble hydrophilic solvent(s), wherein the water-soluble hydrophilic solvent is present in an amount of about 0.1-10% by weight of the composition; and
wherein the solvent-based pigmented ceramic inkjet ink composition further comprises from 15 to 65% (w/w) of a ceramic pigment that imparts color to a surface of a ceramic tile.

2. The process of claim 1 wherein the ceramic tile is a clay tile.

3. The process of claim 1, wherein the ink discharge level is greater than 20 g/m².

4. The process of claim 1, wherein the ink discharge level is greater than 30 g/m².

5. The process of claim 1, wherein the one or more hydrophobic solvent(s) comprises one or more long chain hydrocarbon solvent(s), preferably one or more $C_{12}$-$C_{30}$ hydrocarbon solvent(s).

6. The process of claim 1, wherein the one or more hydrophobic solvent(s) are selected from the group consisting of $C_{12}$-$C_{30}$ aliphatic hydrocarbons and high boiling ester solvents, preferably esters having a boiling point of greater than about 235° C., preferably greater than 280° C., and blends thereof.

7. The process of claim 1, wherein the one or more hydrophobic solvent(s) is one or more $C_{12}$-$C_{30}$ aliphatic hydrocarbon(s).

8. The process of claim 1, wherein the one or more hydrophobic solvent(s) is a high boiling ester solvent(s), preferably esters having a boiling point of greater than about 235° C., preferably greater than 280° C., and blends thereof.

9. The process of claim 1, wherein the hydrophobic solvent comprises dioctyl cocoate.

10. The process of claim 1, wherein the water-soluble hydrophilic solvent is present in an amount of about 0.1-5% by weight of the composition.

11. The process of claim 1, wherein the water-soluble hydrophilic solvent is present in an amount of about 1-10% by weight of the composition.

12. The process of claim 1, wherein the water-soluble hydrophilic solvent is present in an amount of about 1-5% by weight of the composition.

13. The process of claim 1, wherein the water-soluble hydrophilic solvent comprises at least one glycol and/or glycol ether.

14. The process of claim 1, wherein the solvent blend of the composition is a blend of hydrophobic and water-soluble hydrophilic solvents and wherein the hydrophilic solvent has a solubility in water of 2.5% (w/w), or greater, and forms less than 50% of the total solvent blend of the ink composition.

15. The process of claim 1, wherein the water-soluble hydrophilic solvent forms less than 30% of the total solvent blend.

16. The process of claim 1, wherein the water-soluble hydrophilic solvent has a boiling point of greater than 100° C.

17. The process of claim 1, wherein the water-soluble solvent hydrophilic has a boiling point of greater than 150° C.

18. The process of claim 1, wherein the water-soluble hydrophilic solvent comprises a glycol monoalkyl ether.

19. The process of claim 1, wherein the water-soluble hydrophilic solvent comprises a glycol dialkyl ether.

20. The process of claim 1, wherein the water-soluble hydrophilic solvent is selected from the group consisting of propylene glycol, glycerol, liquid poly(ethylene glycol) and combinations thereof.

21. The process according to claim 1 comprising less than about 5%, preferably less than about 3%, more preferably less than about 1% by weight of water.

22. A ceramic tile prepared using the process of claim 1.

23. A solvent-based pigmented ceramic inkjet ink composition comprising:
  from 15 to 65% (w/w) of a ceramic pigment that imparts color to a surface of a ceramic tile;
  a solvent blend wherein the solvent blend comprises one or more hydrophobic solvent(s) and one or more water-soluble hydrophilic solvent(s), wherein the water-soluble hydrophilic solvent is present in an amount of about 0.1-10% by weight of the composition; and
  wherein:
  (i) the one or more hydrophobic solvent(s) are selected from the group consisting of $C_{12}$-$C_{30}$ aliphatic hydrocarbons, dioctyl cocoate and blends thereof and the one or more water-soluble hydrophilic solvent(s) comprises at least one glycol and/or glycol dialkyl ether, or glycerol; or
  (ii) the one or more hydrophobic solvent(s) 1s dioctyl cocoate and the one or more water-soluble hydrophilic solvent(s) comprises at least one glycol monoalkyl ether.

24. A ceramic tile comprising the composition of claim 23.

25. A solvent-based pigmented ceramic inkjet ink composition comprising:
  from 15 to 65% (w/w) of a ceramic pigment that imparts color to a surface of a ceramic tile;
  a solvent blend wherein the solvent blend comprises one or more hydrophobic solvent(s) and one or more water-soluble hydrophilic solvent(s)), wherein the water-soluble hydrophilic solvent is present in an amount of about 0.1-10% by weight of the composition;
  wherein the one or more hydrophobic solvent(s) are selected from the group consisting of $C_{12}$-$C_{30}$ aliphatic hydrocarbons, high boiling point ester solvents having a boiling point of greater than about 235° C., and blends thereof; and
  wherein the one or more water-soluble hydrophilic solvent(s) comprises one or more glycol(s) and/or glycol ether(s), or poly(ethylene) glycol(s);
  wherein the one or more glycol(s) is selected from ethylene glycol, diethylene glycol, triethylene glycol, tetraethylene glycol, propylene glycol, dipropylene glycol, tripropylene glycol, tetrapropylene glycol, butylene glycol, dibutylene glycol, tributylene glycol or tetrabutylene glycol; and
  wherein the one or more glycol ether(s) is selected from dipropylene glycol monobutyl ether, dipropylene glycol monopropyl ether, propylene glycol monobutyl ether, propylene glycol monopropyl ether, tripropylene glycol monobutyl ether, dipropylene glycol monomethyl ether, dipropylene glycol dimethyl ether, ethylene glycol phenyl ether or propylene glycol methyl ether.

\* \* \* \* \*